United States Patent [19]

Yamashita

[11] 4,203,076
[45] May 13, 1980

[54] CLOCK PULSE SIGNAL GENERATOR HAVING AN AUTOMATIC FREQUENCY CONTROL CIRCUIT

[75] Inventor: Noriyuki Yamashita, Ichikawa, Japan

[73] Assignee: Sony Corporation, Tokyo, Japan

[21] Appl. No.: 828,605

[22] Filed: Aug. 29, 1977

[30] Foreign Application Priority Data

Sep. 3, 1976 [JP] Japan .................. 51-105977

[51] Int. Cl.² .................. H03B 3/04; H04N 5/05; H04N 5/78
[52] U.S. Cl. .................. 331/25; 331/20; 358/158; 360/36
[58] Field of Search .................. 358/8, 148, 158, 159; 360/36–38; 331/1 A, 17, 18, 20, 25

[56] References Cited

U.S. PATENT DOCUMENTS

| 3,567,857 | 3/1971 | Lynn | 358/158 |
|---|---|---|---|
| 3,820,154 | 6/1974 | Faroudja et al. | 358/8 |
| 3,956,710 | 5/1976 | Seitz et al. | 331/25 X |
| 3,988,696 | 10/1976 | Sharpe | 331/25 X |
| 4,015,288 | 3/1977 | Ebihara et al. | 358/8 X |
| 4,025,951 | 5/1977 | Eckenbrecht | 358/158 |
| 4,054,903 | 10/1977 | Ninomiya | 360/36 X |
| 4,069,499 | 1/1978 | Ninomiya | 358/8 |

Primary Examiner—Robert L. Griffin
Assistant Examiner—Aristotelis M. Psitos
Attorney, Agent, or Firm—Lewis H. Eslinger; Alvin Sinderbrand

[57] ABSTRACT

A clock pulse generator which has the frequency of its output automatically controlled by comparison of the generated clock pulses with an external reference signal comprises an input for receiving the reference signal, a voltage controlled oscillator for generating the clock pulses, a counter for frequency-dividing the clock pulses to obtain a comparing signal having substantially the same frequency as the external reference signal, a phase comparator for comparing the phase of the comparing signal with the phase of the external reference signal and providing the control voltage for the oscillator in response to a detected phase difference therebetween, and an inhibiting circuit for inhibiting the control voltage whenever the phase of the external reference signal is outside a predetermined range with respect to the comparing signal.

4 Claims, 69 Drawing Figures

CLOCK PULSE SIGNAL GENERATOR HAVING AN AUTOMATIC FREQUENCY CONTROL CIRCUIT

BACKGROUND OF THE INVENTION

1. Field of the Invention

This invention relates generally to the processing of periodic information signals, such as video signals, and more particularly is directed to improvements in the write clock pulse signal generator used in a time base corrector for correcting errors introduced during recording and/or reproducing of such periodic information signals.

2. Description of the Prior Art

Video signals are frequently recorded on a magnetic tape and subsequently reproduced for later broadcasting or viewing purposes. During the reproduction of recorded video signals, time base or frequency errors are usually introduced by reason of expansion or contraction of the record medium during or after recording, variation in the speed of the tape relative to the magnetic head or heads during recording or reproduction, variation between the tape recording speed and the tape reproducing speed, and the like. The presence of such time base errors in the reproduced video signals causes a frequency shift of the latter which can result in many observable undesirable effects, particularly when the reproduced video signals are to be transmitted or broadcast and especially if the reproduced video signals are to be mixed with live broadcast material that does not have such time base errors. The observable undesirable effects resulting from relatively small time base errors are a smeared or jittery picture with erroneous intensity variations and, in the case of color video signals, improper color display. When the time base errors are large, the reproduced picture will fail to lock horizontally or vertically.

In an existing time base corrector for substantially removing time base errors from video signals, for example, as disclosed in U.S. Pat. No. 3,860,952, issued Jan. 14, 1975, the incoming video signals are converted from analog to digital form and temporarily stored in a memory. Time base errors are removed from the video signals by writing the digitized signals in the memory at a clocking rate which varies in a manner generally proportional to the time base errors, and by fetching or reading out these stored signals at a standard clocking rate. After such reading out of the digitized video signals, the latter is reconverted to analog form and applied to an output terminal. In the foregoing time base corrector, the rate at which the digitized signals are written in the memory is determined by a write clock pulse signal from a variable frequency or voltage controlled oscillator (VCO) which derives its control voltage from a comparator in which the output of the VCO, after being suitably divided, is compared with the horizontal synchronizing signal separated from the incoming video signals so as to control the frequency of the write clock pulse signal. However, whenever the horizontal synchronizing signals are intermittent or absent because of the occurrence of drop-out, or whenever there is a skew error in the reproduced video signal, the period between the horizontal synchronizing signals becomes much longer than normal. On the other hand, when guard band noise is mixed as a quasi-horizontal synchronizing signal with the normal horizontal synchronizing signal, the period between horizontal synchronizing signals becomes shorter than normal. In such conditions, the frequency of the write clock pulse signal is so varied by the errors in periods between horizontal synchronizing signals that it sometimes becomes impossible to write the digitized signals into memory.

OBJECTS AND SUMMARY OF THE INVENTION

Accordingly, it is an object of this invention to provide an improved write clock pulse signal generator for a time base corrector of the type described above, and in which the frequency of the write clock pulse signal is accurately varied in dependence on time base errors contained in the incoming video or other periodic information signals.

Another object is to provide a write clock pulse signal generator, as aforesaid, in which the automatic frequency control of the write clock pulse signal generator is disabled and the write clock pulse signal generator is held at a stable frequency to prevent overcorrection for gross or abrupt time base errors in the incoming video or periodic information signals, such as the time base errors attributable to drop-out and skew error included in the incoming video signal.

In accordance with an aspect of this invention, a write clock pulse signal generator having automatic frequency control for controlling the frequency thereof by comparison of the generated write clock pulses with an external reference signal, such as the horizontal synchronizing signal reproduced from a recorded video signal, comprises an input circuit for receiving the external reference signal, a controlled oscillator for generating a write clock signal in response to a control signal or voltage applied thereto; a frequency-dividing counter for frequency dividing the write clock signal to obtain a comparing signal having substantially the same frequency as the external reference signal; a phase comparator for comparing the phase of the comparing signal with the phase of the external reference signal and generating the control signal or voltage in correspondence to a detected phase difference therebetween; and an inhibiting circuit for inhibiting the frequency control signal whenever the phase of the external reference signal is outside a predetermined range with respect to the phase of the comparing signal. The inhibiting circuit can include a window pulse forming circuit, and a detecting circuit producing detecting signals depending on whether or not a pulse synchronized with the external reference signal occurs during the window pulse. The inhibiting circuit can further include a timing circuit having first and second counters connected so as to provide a signal inhibiting the control signal for a predetermined length of time after the pulse synchronized with the horizontal synchronizing pulse is detected outside the window pulse. In an alternative configuration, the timing circuit can include a pair of monostable multivibrators providing a signal of a predetermined duration for inhibiting the control signal. The write clock pulse generator also preferably includes a load signal circuit for loading the frequency-dividing counter to a predetermined count whenever the external reference signal is outside the predetermined range in advance of the phase of the comparing signal.

In accordance with an important feature of this invention, the automatic frequency control circuit is inhibited whenever the a a length of time that there is an uncorrectable error in the horizontal synchronizing signals separated from the reproduced video signal exceeds a predetermined time. After the disturbance in the horizontal synchronizing signals continues beyond the predetermined time, the control voltage for the VCO is generated, whereby the automatic frequency control circuit is locked in very quickly and is kept locked in even in still and slow-motion modes.

The above, and other objects, features and advantages of the invention, will be apparent in the following detailed description of an illustrative embodiment which is to be read in conjunction with the accompanying drawings.

DESCRIPTION OF THE PREFERRED EMBODIMENTS

Figure 1:
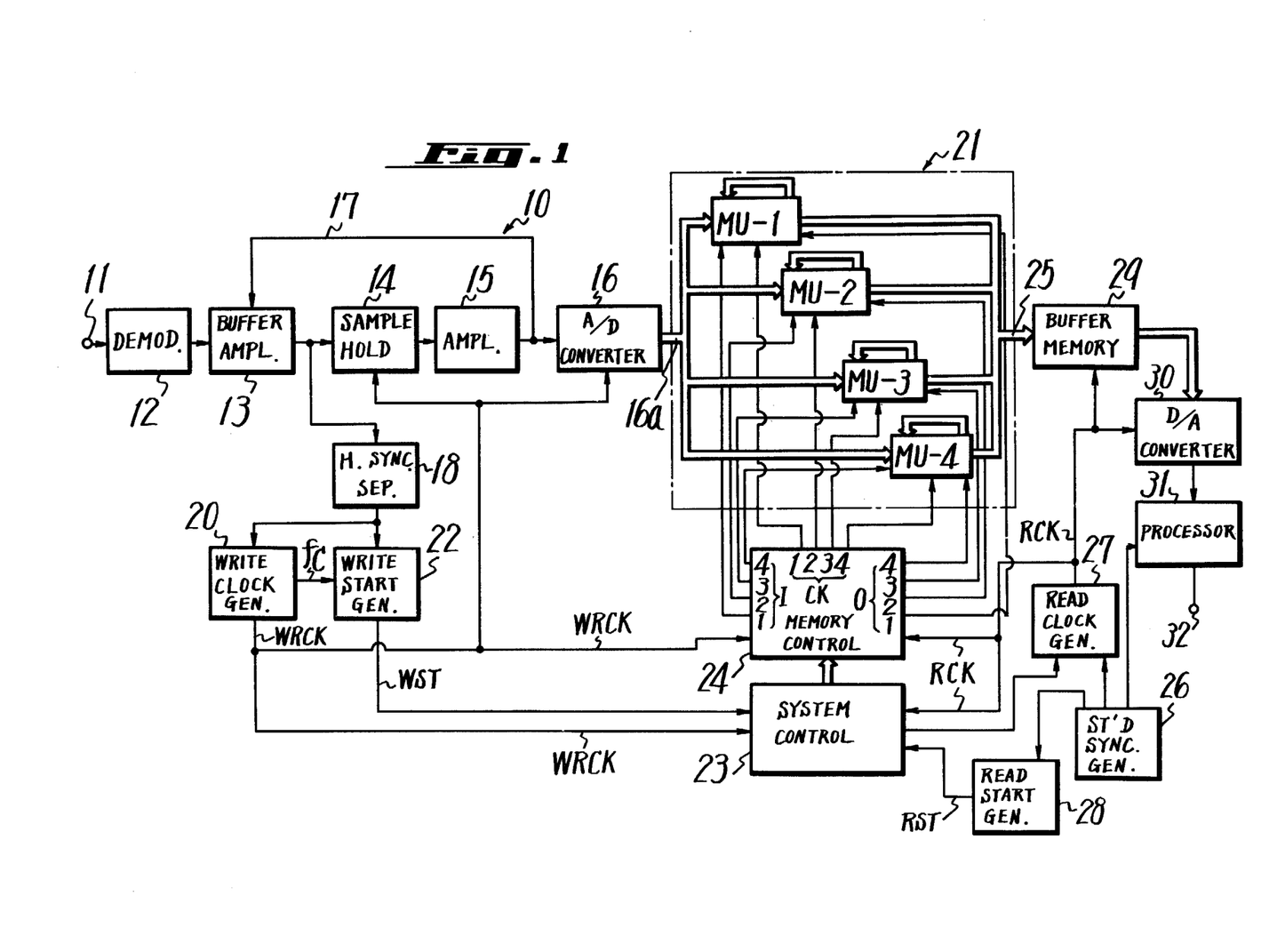
FIG. 1 is a schematic block diagram of a time base corrector in which a write clock pulse signal generator according to this invention may be advantageously employed.
Figure 2:
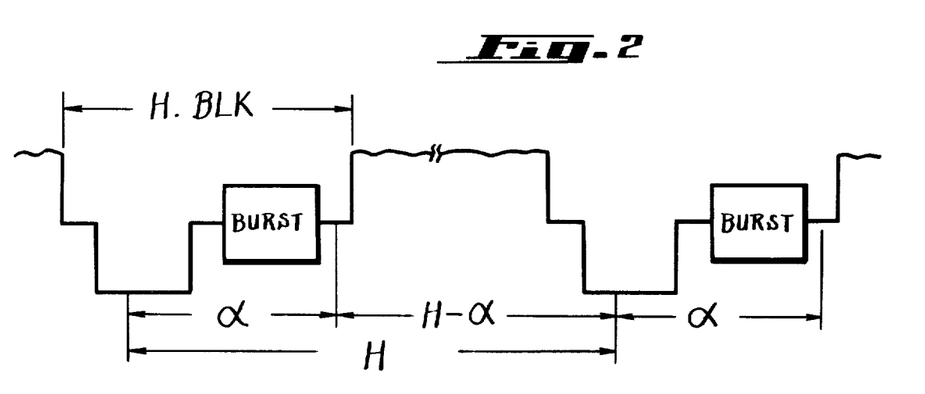
FIG. 2 is a schematic diagram illustrating a color video signal that may be applied to the time base corrector of FIG. 1 for removal of time base errors from such signal.

Referring to the drawings in detail, and initially to FIG. 1 thereof, it will be seen that a time base corrector 10 to which this invention may be applied is desirably of the type disclosed in U.S. Patent application Ser. No. 684,488, filed May 10, 1976, and having a common assignee herewith. Such time base corrector 10 is shown to have an input terminal 11 for receiving periodic information signals, such as composite color video signals reproduced by a so-called VTR and having time base errors. If the reproduced composite color video signals applied to terminal 11 are not already in the standard NTSC form, such signals are applied to a demodulator 12 which may include an NTSC encoder. The resulting NTSC color video signals are applied through a buffer amplifier 13 to a sample-hold circuit 14 and from the latter through an amplifier 15 to an analog-to-digital (A/D) converter 16. As shown, a D.C. restoring loop 17 is provided between amplifiers 13 and 15 so that the NTSC color video signals are sampled in D.C. restored form.

The D.C. restored NTSC color video signals issuing from amplifier 13 are further applied to a separator 18 which separates horizontal synchronizing signals therefrom. The separated horizontal synchronizing signals are applied to a write clock pulse signal generator 20 which, as is hereinafter described in detail, produces write clock pulses WRCK having a relatively high frequency, for example, of about 21.5 MH$_z$ which is six times the color or chrominance subcarrier frequency f$_C$ for NTSC signals, and with their frequency or repetition rate being varied in accordance with changes in the frequency of the horizontal synchronizing signals extracted from the incoming color video signals so as to closely follow, or be dependent upon time base errors in such incoming signals.

Further, it will be seen that the write clock pulses WRCK issuing from generator 20 and having a frequency of approximately 21.5 MH$_z$ are applied to A/D converter 16 and to sample-hold circuit 14 to control the rate at which the latter samples the demodulated or detected video signals and the rate at which converter 16 converts the sampled signals from their original analog form into digital form. More specifically, in response to each write clock pulse from generator 20, A/D converter 16 is operative to sample the demodulated video signal and convert the latter into a plurality of parallel bit signals, for example, digital information of eight parallel bits.

The parallel bits of digitized signal information are supplied from converter 16 to a memory 21 by way of a digital information bus 16a which, for ease of illustration, is represented by a double line. The memory 21 is shown to include memory units MU-1, MU-2, MU-3 and MU-4, each of which is comprised of a plurality of shift registers equal in number to the number of parallel bits making up each word of the digitized video signals. Thus, in the example being described, each of the four memory units MU-1, MU-2, MU-3 and MU-4 is made up of eight shift registers.

Each shift register of the memory units MU-1, MU-2, MU-3 and MU-4 is desirably selected to have a storage capacity or memory which, in light of the frequency of the write clock pulses from generator 20, is sufficient to store the digitized information corresponding to an even number, that is, 2, 4, 6, 8 . . . etc., of the horizontal or line intervals of the incoming video signals. In the illustrated time base corrector, the horizontal synchronizing signals and burst signals occurring during the interval α in each horizontal blanking period are preferably stripped from the incoming video signals prior to the conversion of the latter to digital form so that, for example, only 640 words of digital information need to be accommodated in the registers of memory units MU-1, MU-2, MU-3 and MU-4 for each of the even number of horizontal or line intervals to be stored therein. Thus, if the digital information corresponding to two horizontal or line intervals is to be stored in each of the memory units MU-1, MU-2, MU-3 and MU-4, the registers of such memory units have to have capacities for 1280 words corresponding to the sampling in the period 2H–2α, as indicated on FIG. 3.

The separated horizontal synchronizing signals are further shown to be applied to a write start generator 22 which also receives a chrominance subcarrier signal f$_C$ from generator 20 and produced a write start pulse WST, for example, at the beginning of every second horizontal or line interval of the incoming video signals (where digital information corresponding to two horizontal or line intervals is to be stored in each of the memory units).

The write start pulses WST from generator 22, and the write clock pulses WRCK from generator 20 are applied to a system control circuit 23 which controls the operations of a memory control circuit 24 for effecting the selective writing and reading operations of the memory units MU-1, MU-2, MU-3 and MU-4. More particularly, under normal circumstances, system control circuit 23 causes memory control circuit 24 to produce write control signals $I_1$, $I_2$, $I_3$ and $I_4$ occurring in a repeating cyclic order and which are respectively applied to the memory units MU-1, MU-2, MU-3 and MU-4 in order to determine the sequences in which such memory units are selected or enabled for the writing, in the selected memory unit, of the digitized information corresponding to two, or any other even number of horizontal or line intervals of the incoming video signals. Further, the memory control 24 receives the write clock pulses WRCK from generator 20 and, during the writing period determined by the write control signal $I_1$, $I_2$, $I_3$ or $I_4$, the memory control 24 supplies the write clock pulses WRCK from one of its clock outputs $CK_1$, $CK_2$, $CK_3$ and $CK_4$ to the respective memory unit MU-1, MU-2, MU-3, or MU-4 which is then selected or enabled for writing, so that the digitized information corresponding to two horizontal or line intervals of the video signals is written in the shift registers of the selected memory unit at the clocking rate determined by the frequency of the write clock pulses WRCK which varies in accordance with time base errors in the incoming video signals.

After momentary storage in memory units MU-1, MU-2, MU-3 and MU-4, the digitized video signal information is read out therefrom in a predetermined sequence to an information or data bus 25. In order to determine the clocking rate at which the digitized information is read out of each of the memory units, the illustrated time base corrector 10 includes a standard sync generator 26 which supplies a carrier signal at a fixed or standard frequency, for example, the standard chrominance subcarrier frequency $f_C$ of 3.58 MH$_z$ for NTSC color video signals, to a read clock generator 27 which, in turn, produces read clock pulses RCK at a standard frequency, at least at the beginning and end of each reading period. The carrier signal at a fixed or standard frequency is further shown to be applied to a read start generator 28 which produces a read start pulse RST, for example, at intervals corresponding to two horizontal or line intervals for NTSC video signals.

The read start pulses RST from generator 28 are applied to system control circuit 23, and the read clock pulses RCK are applied from generator 27 to system control circuit 23 and memory control circuit 24. Under normal circumstances, system control circuit 23 causes memory control circuit 24 to produce read control signals $O_1$, $O_2$, $O_3$ and $O_4$ occurring in a repeating cyclic order and which are respectively applied to memory units MU-1, MU-2, MU-3 and MU-4 in order to determine the sequence in which such memory units are selected or enabled for the reading out therefrom of the digitized information corresponding to two, or any other even number of horizontal or line intervals, which had been previously stored in the selected memory unit. Further, during each reading period determined by the read control signal $O_1$, $O_2$, $O_3$ or $O_4$, the memory control circuit 24 supplies the read clock pulses RCK from a respective one of its clock putputs $CK_1$, $CK_2$, $CK_3$ and $CK_4$ to the selected or enabled memory unit, so that the digitized information corresponding to two horizontal or line intervals of the video signals is read out of the shift registers of the selected memory unit at the standard clocking rate of the read clock pulses RCK.

The read clock pulses RCK are also applied to a buffer memory 29, which receives the digitized information sequentially read out of memory 21, and to a digital-to-analog (D/A) converter 30 which is operative to convert the buffered digital output of memory 29 back to the original analog form. The analog output of D/A converter 30 is applied to a processor 31 which receives the standard frequency carrier signal from generator 26, and which is operative to add to the output of converter 30 the color burst and composite synchronizing signals which were previously stripped from the incoming video signals. The resulting composite color video signals are then obtained at an output terminal 32 of processor 31.

In any event, it will be apparent that, in the time base corrector 10, as described above, successive line intervals of the incoming video signals are written in memory 21 at a clocking rate which varies generally in accordance with the time base errors of the incoming signals, and that the video signals are read out from memory 21 at a standard clocking rate so that the video signals obtained at output terminal 32 have any time base errors removed therefrom.

Figure 3:
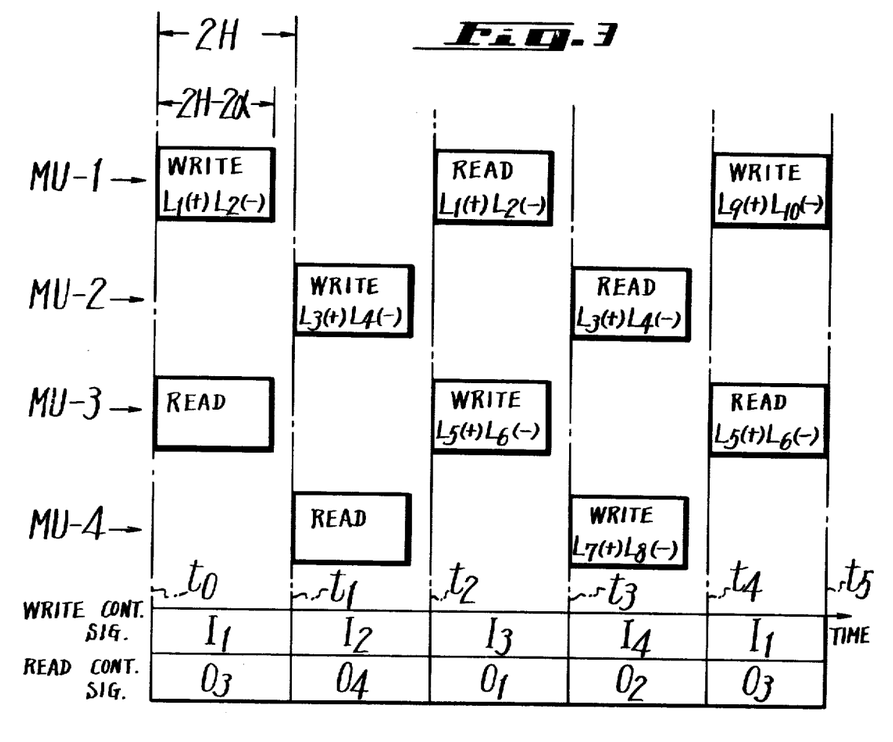
FIG. 3 is a timing chart showing the cyclic order in which signal information may normally be written in, and read out of, the several memory units of the time base corrector of FIG. 1.

As is shown on FIG. 3, in the illustrated time base corrector 10, the cyclically occurring write control signals $I_1$, $I_2$, $I_3$ and $I_4$ for sequentially writing digital information corresponding to two, or any other even number of horizontal or line intervals, in each of the memory units MU-1, MU-2, MU-3 and MU-4 may normally occur simultaneously with the cyclically occurring read control signals $O_3$, $O_4$, $O_1$ and $O_2$, respectively, for sequentially reading out the digital information previously stored in the respective memory units MU-3, MU-4, MU-1 and MU-2, respectively. Thus, in the successive time periods $t_0$-$t_1$, $t_1$-$t_2$, $t_2$-$t_3$, $t_3$-$t_4$, $t_4$-$t_5$, ... etc., digitized signals corresponding to line intervals $L_1$ and $L_2$, $L_3$ and $L_4$, $L_5$ and $L_6$, $L_7$ and $L_8$, $L_9$ and $L_{10}$, ... etc. are written sequentially in memory units MU-1, MU-2, MU-3, MU-4, MU-1, ... etc. Correspondingly, the digitized signals representing line intervals $L_1$ and $L_2$, $L_3$ and $L_4$, $L_5$ and $L_6$, ... etc. are read out of the respective memory units MU-1, MU-2, MU-3 ... etc., during the time intervals $t_2$-$t_3$, $t_3$-$t_4$, $t_4$-$t_5$, ... etc.

Figure 4:
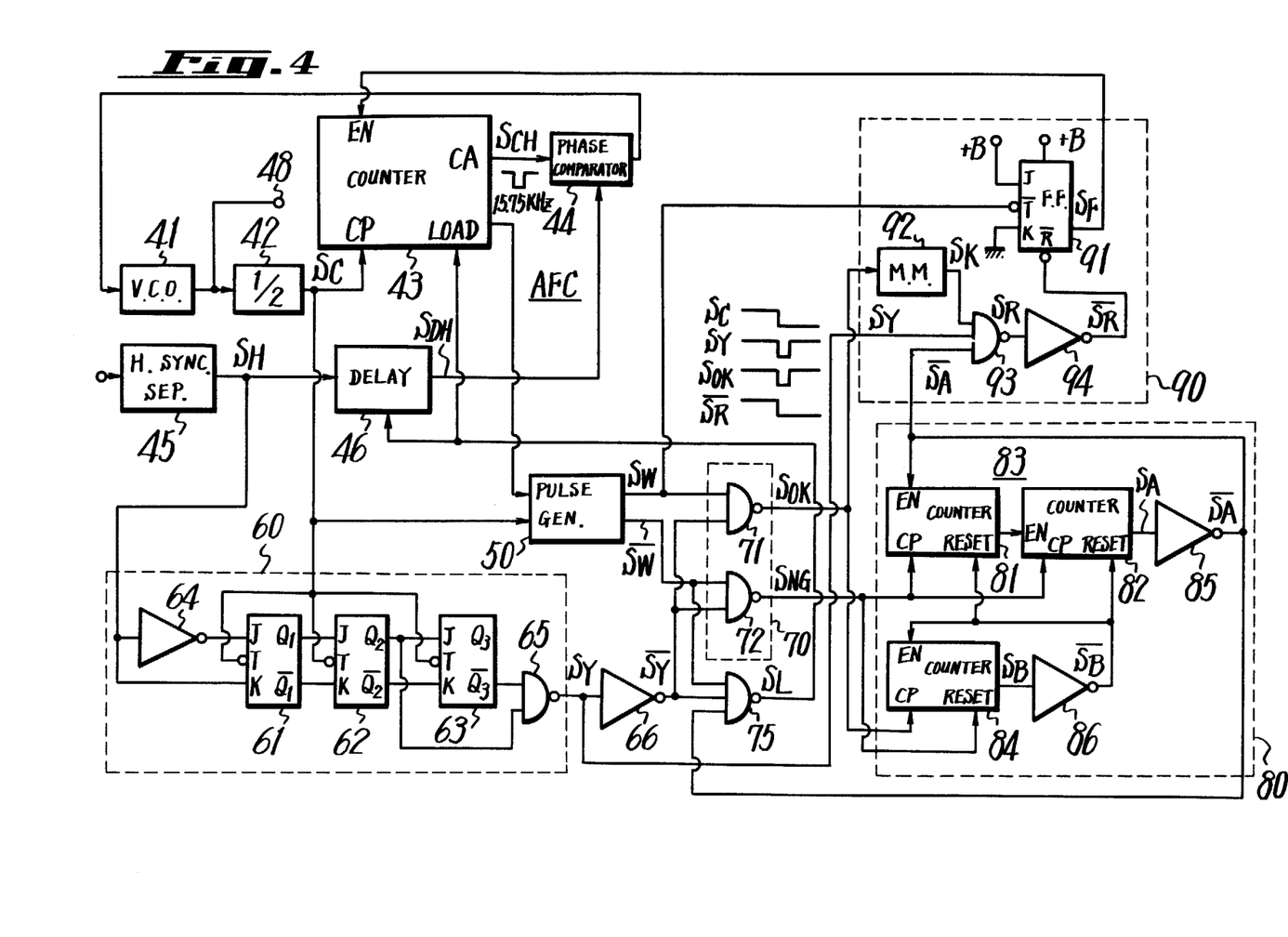
FIG. 4 is a schematic block diagram of a write clock pulse signal generator according to an embodiment of this invention.

FIG. 4 is a schematic block diagram of an automatic frequency control (AFC) circuit of the present invention for use with the write clock signal generator 20 shown in FIG. 1 in which the frequency of the write clock signal is controlled in accordance with the reproduced horizontal synchronizing signal.

In FIG. 4, 41 designates a voltage controlled oscillator whose oscillation center frequency is, for example, twelve times the chrominance subcarrier frequency, that is, about 43 MH$_z$, 42 a frequency divider which divides the oscillation signal of voltage controlled oscillator 41 by two, 43 a counter which further divides the output signal of frequency divider 42 to produce a signal with the horizontal or line frequency 15.75 KH$_z$, 44 a phase comparator, 45 a horizontal synchronizing signal separator, and 46 a delay circuit or line.

Figure 5A:
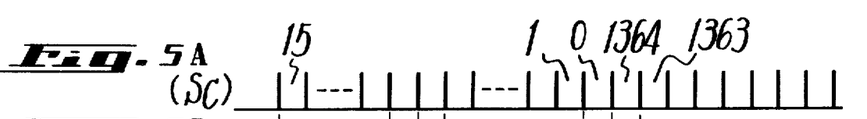
FIGS. 5 to 8 are waveform diagrams to which references will be made in explaining the operation of the write clock pulse signal generator of FIG. 4.
Figure 5B:
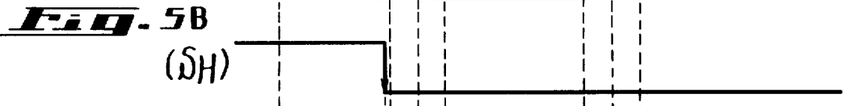
Figure 5C:
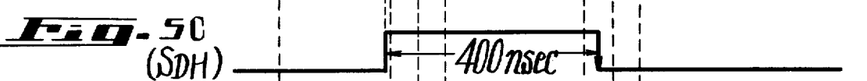
Figures 5D, 5E:
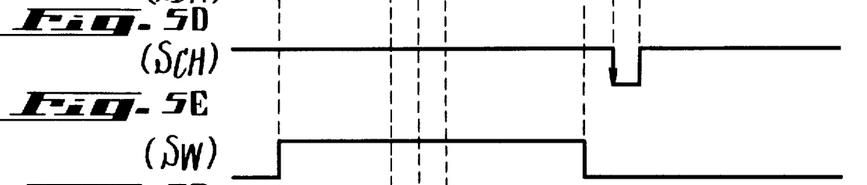
Figure 5F:
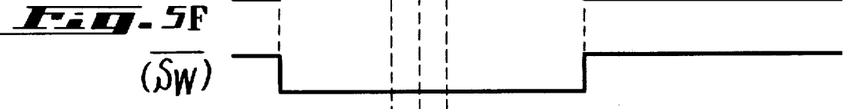

In the circuit of FIG. 4, a reproduced video signal is applied to horizontal synchronizing signal separator 45 which then produces a horizontal synchronizing signal $S_H$ (shown in FIG. 5B) and applies the same to delay line 46. Thus, delay line 46 produces a signal $S_{DH}$ (FIG. 5C), which is normally delayed 400 nanoseconds from the front edge of the horizontal synchronizing signal. The signal $S_{DH}$ is applied to an input of phase comparator 44. A signal $S_C$ with the frequency of 21.5 MH$_z$ (FIG. 5A) from divider 42 is fed to counter 43 as its clock signal. Thus, when 1365 periods of signal $S_C$ are counted by counter 43, counter 43 produces a signal $S_{CH}$ which becomes "0" for a time equal to one period of signal $S_C$ (FIG. 5D). Therefore, the signal $S_{CH}$ has a frequency, equal to the horizontal synchronizing frequency. In this example, a down counter is used as the counter 43 and its initial load value is set at "1364".

The signal $S_{CH}$ of counter 43 is fed to phase comparator 44 to be compared with the signal $S_{DH}$ of delay line 46. A compared error voltage from phase comparator 44 is supplied to the voltage controlled oscillator 41 to control the oscillation frequency of the latter. Thus, at an output terminal 48 of voltage controlled oscillator 41 there is provided an output signal whose frequency is controlled in accordance with the time base error of the reproduced horizontal synchronizing signal $S_H$.

With the present invention, there is produced a window pulse signal having a pulse width corresponding to the number of counts in the counter 43 from a first predetermined count to a second predetermined count, that is, a predetermined number of periods of the signal $S_C$. Further, in response to the horizontal synchronizing signal $S_H$ there is produced a signal $S_Y$ (FIG. 5L) which becomes "0" for a length of time, for example, for one period, of signal $S_C$ in synchronism with the reproduced horizontal synchronizing signal $S_H$. The window pulse signal $S_W$ and signal $S_Y$ being thus obtained, the AFC circuit is controlled in the following manner. Whenever the signal $S_Y$ is "0" during the window pulse signal $S_W$, the AFC circuit is considered as in a lock-in state for performing the phase comparison operation. However, when the signal $S_Y$ is not "0" during the window pulse signal $S_W$, the AFC circuit is considered as in a lock-out state and the phase comparison operation is inhibited.

Figure 5G:
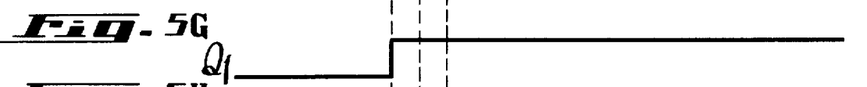
Figure 5H:
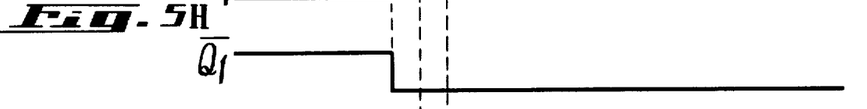
Figures 5I, 5J:
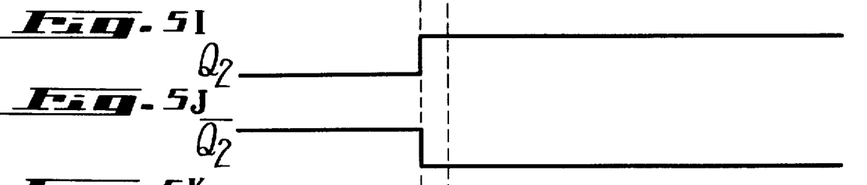
Figure 5K:
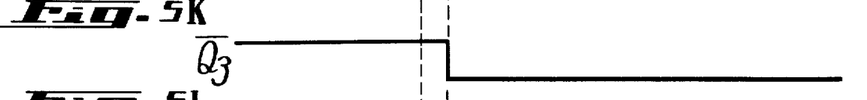
Figure 5L:
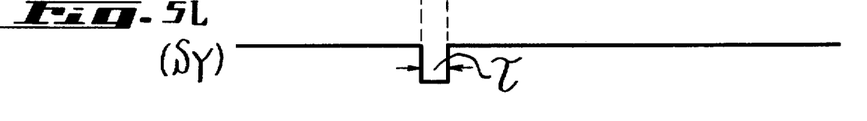
Figure 6A:
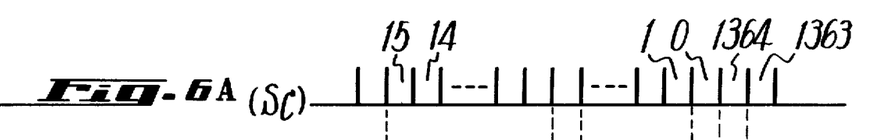
Figure 6B:
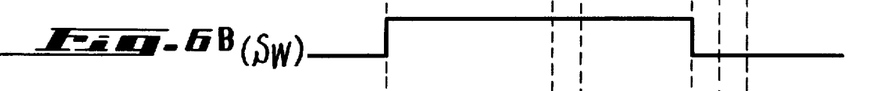
Figure 6C:
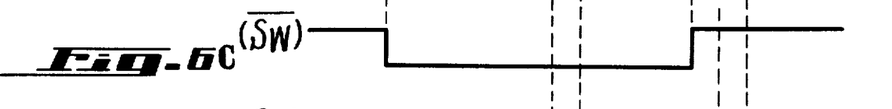
Figure 6D:
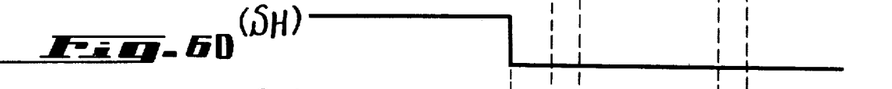
Figures 6E, 6F:
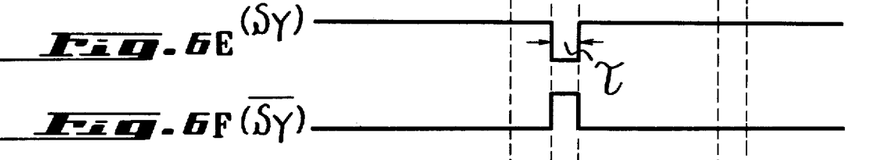
Figure 6G:
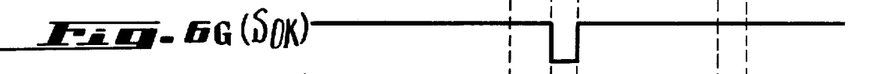
Figure 6H:
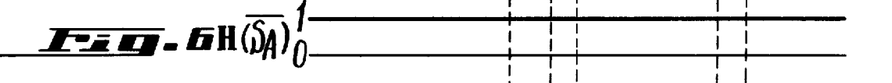
Figure 6I:
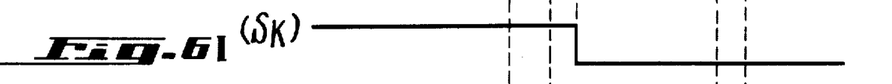
Figure 6J:
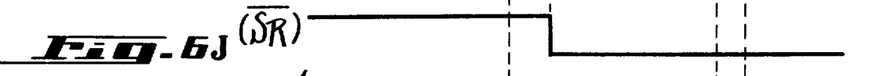
Figure 6K:
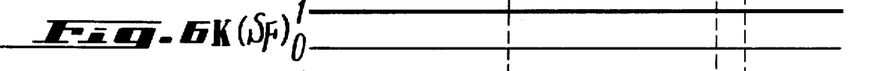
Figure 6L:
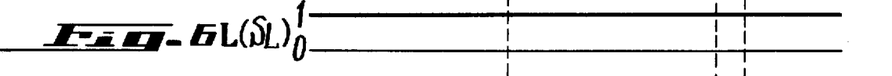
Figure 6M:
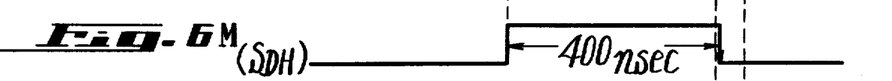
Figure 6N:
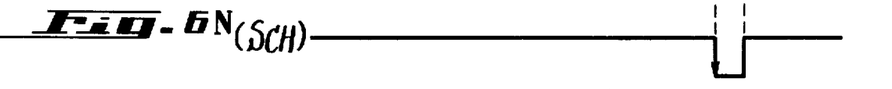

In FIG. 4, 50 denotes a pulse signal generator for generating the window pulse signal $S_W$ which is supplied with the signal $S_C$(FIG. 5A) having the frequency 21.5 MHz from divider 42 and the output signal from the counter 43. The generator 50 produces window pulse signal $S_W$(FIG. 5E), which becomes "1" for 15 counts from count "15" to count "1" of counter 43 in synchronism with signal $S_C$ (FIG. 5A), and inverted window pulse signal $\overline{S_W}$(FIG. 5F), which is opposite in phase to window pulse signal $S_W$. 60 denotes a signal generator for producing the signal $S_Y$, which comprises first to third J-K flip-flops 61 to 63, an inverter 64 and a NAND-circuit 65. The signal $S_C$ of divider 42 is fed to respective clock terminals T of first to third J-K flip-flops 61 to 63, while the reproduced horizontal synchronizing signal $S_H$(FIG. 5B) of separator 45 is fed to the K terminal of first flip-flop 61 and to inverter 64 which is connected to the J terminal of first flip-flop 61, to provide an inverted horizontal synchronizing signal $\overline{S_H}$ to the latter. Signals obtained at the $Q_1$ and $\overline{Q_1}$ terminals of first flip-flop 61, which are shown in FIGS. 5G and 5H, are applied to the J and K terminals of second flip-flop 62, respectively. Further, signals obtained at the $Q_2$ and $\overline{Q_2}$ terminals of second flip-flop 62, which are shown in FIGS. 5I and 5J, are applied to the J and K terminals of third flip-flop 63, respectively. A signal obtained at the $\overline{Q_3}$ terminal of third flip-flop 63, which is shown in FIG. 5K, and the signal obtained at the $Q_2$ terminal of second flip-flop 62 are fed to NAND-circuit 65 which then produces pulse $S_Y$ (FIG. 5L) for a time equal to one period of the clock pulse signal $S_C$.

In FIG. 4, 70 designates a detecting circuit which detects whether the signal $S_Y$ exists in the period within which window pulse signal $S_W$ is in the state of "1" or 0. This detecting circuit 70 is composed of a pair of NAND-circuits 71 and 72 which are supplied with the window pulse signal $S_W$, inverted window pulse signal $\overline{S_W}$ from pulse generator 50 and with inverted signal $\overline{S_Y}$ from an inverter 66 which is supplied with signal $S_Y$ from signal generator 60. Since NAND-circuit 71 is supplied with the window pulse $S_W$ and the inverted signal $\overline{S_Y}$, NAND-circuit 71 produces a pulse signal $S_{OK}$ which becomes "0" for a time $\tau$ equal to the pulse width of signal $S_Y$, when signal $S_Y$ becomes "0" during window pulse $S_W$. NAND-circuit 72 is supplied with the inverted window pulse $\overline{S_W}$ and the inverted signal $\overline{S_Y}$, so that NAND-circuit 72 produces a pulse signal $S_{NG}$ which becomes "0" for a time equal to the pulse width $\tau$ of signal $S_Y$, when signal $S_Y$ becomes "0" outside the window pulse $S_W$.

In FIG. 4, 80 represents a timing circuit which will count pulses $S_{OK}$ and $S_{NG}$ from detecting circuit 70 and provide a signal $S_A$ for inhibiting the counter 43 for a time equal to a predetermined number of pulses $S_{NG}$. This counter circuit 80 consists of an 8 bit binary counter 83 which is formed of counters 81 and 82, a 4 bit binary counter 84 and a pair of inverters 85 and 86. When counter 83 counts pulse $S_{NG}$ up to count of "255", an output signal $S_A$ of counter 83 is changed from "0" to "1". Accordingly, an output $\overline{S_A}$ of inverter 85, which is supplied with output $S_A$ of counter 83, is changed to "0" from "1". Since the output $\overline{S_A}$ of inverter 85 is fed to an enable terminal EN of counter 81, the counter 83 is held at "255" during the time that the output $S_A$ is "0". It should be noted herein that because the pulses $S_{NG}$ are counted up to a count of "255", the signals $S_Y$ occur during the window pulses $S_W$ for a time equal to approximately one vertical scanning period or video field. When the pulses $S_{OK}$ are counted up to a count of "15" in the counter 84, and output $S_B$ of counter 84 is changed from "0" to "1" with the result that an output $\overline{S_B}$ of inverter 86, which is supplied with the output $S_B$ from the counter 84, is changed to "0" from "1". Since the output $\overline{S_B}$ of inverter 86 is fed to an enable terminal EN of counter 84, the counter 84 is held at "15" during the time that the output $\overline{S_B}$ is "0". The output $\overline{S_B}$ of inverter 86 is also fed to counter 83 at its reset terminal RESET, so that counter 83 is reset to "0" when the output $\overline{S_B}$ becomes "0". Further, the output $S_{NG}$ of NAND-circuit 72 is fed to a reset terminal RESET of counter 84, so that when even one pulse $S_{NG}$ is fed to counter 84 the counter 84 is reset to "0".

Accordingly, the output $\overline{S_A}$ of inverter 85 becomes "1" from the time when fifteen pulses $S_{OK}$ are fed continuously to timing circuit 80 from detecting circuit 70, inverter 85 remains in the "1" state until 255 pulses $S_{NG}$ are fed to timing circuit 80.

A load signal generator 75 is provided which is formed here of, a NAND-circuit and is supplied with the inverted window pulse signal $\overline{S_W}$ from pulse generator 50, inverted signal $\overline{S_Y}$ from inverter 66 and output $\overline{S_A}$ of counter timing circuit 80. Thus, the load signal generator 75 produces a load signal $S_L$ which is fed to a load terminal LOAD of counter 43, so that when load signal $S_L$ becomes "0", the initial state of counter 43 is changed from "1364" to "1371" which is greater than the former by 7 counts. The load signal $S_L$ is also fed to delay circuit 46, so that when the load signal $S_L$ becomes "0", the output signal $S_{DH}$ of delay circuit 46 is forced to a "0" state from its "1" state.

A hold signal generator 90 is further provided, which consists of a flip-flop 91, a monostable multivibrator 92, a NAND-circuit 3 and an inverter 94. An output signal $S_R$ from the NAND circuit 93 is supplied to a reset terminal of the flip-flop 91 through the inverter 94, in which the output signal $S_R$ is inverted to form signal $\overline{S}_R$. If signal $\overline{S}_R$ is "1", when the window pulse signal $S_W$ from pulse signal generator 50 is fed to flip-flop 91 at its T terminal, flip-flop 91 is triggered by the window pulse $S_W$ at its negative-going edge and hence an output $S_F$ of flip-flop 91 becomes "0". On the other hand, when flip-flop 91 is triggered by the negative-going edge of the window pulse $S_W$ while the signal $\overline{S}_R$ is "0", the output $S_F$ of flip-flop 91 becomes "1". The monostable multivibrator 92 is triggered by the pulse $S_{OK}$ from detecting circuit 70 at its positive-going edge and hence its output $S_K$ changes from "1" to "0". NAND-circuit 93 is supplied with the output $S_K$ from monostable multivibrator 92, signal $S_Y$ from signal generator 60 and output $\overline{S}_A$ from timing circuit 80. The output $S_F$ of flip-flop 91 is derived as the output of hold signal generator 90. Since this output $S_F$ is fed to an enable terminal EN of counter 43, the state of counter 43 is held during the time that signal $S_F$ is "0".

THE OPERATION IN THE NORMAL CONDITION

First, the operation in the normal condition, that is, when the negative-going edge of the horizontal synchronizing signal $S_H$ occurs during the duration of the window pulse $S_W$, will be explained with reference to FIG. 6.

As shown in FIG. 6, when at least 15 of the pulse periods $\tau$ of signal $S_Y$ (FIG. 6E) exists within the period when the window pulse $S_W$ (FIG. 6B) is "1", the output $\overline{S}_A$ (FIG. 6H) of counter circuit 80 is always "1". On the other hand, monostable multivibrator 92 of hold signal generator 90 is triggered by the signal $S_{OK}$ at its positive-going edge. As a result, the output $S_K$ (FIG. 6I) of monostable multivibrator 92 becomes "0", so that the output $S_R$ of NAND-circuit 93 becomes "1" after the negative-going edge of output $S_K$. Accordingly, the output $\overline{S}_R$ (FIG. 6J) of inverter 94 remains "0" at the negative-going edge of window pulse $S_W$, so that the output $S_F$ (FIG. 6K) of flip-flop 91 remains in the "1" state. This means that the state of counter 43 is not forceably held by the output $S_F$. Further, when the signal $\overline{S}_R$ becomes "0" during the duration of the inverted window pulse $\overline{S}_W$, the load signal $S_L$ from the NAND-circuit 75 remains in the state "1", so that the negative-going edge of the reproduced horizontal synchronizing signal is delayed by a predetermined value, for example, 400 n sec, in the delay circuit 46. As a result, the output signal $S_{DH}$ shown in FIG. 6M, is derived from delay circuit 46. It is noted that the duration 400 n sec corresponds to about 8.5 pulses of clock signal $S_C$. Since a carry terminal CA of counter 43 provides the signal $S_{CH}$ (FIG. 6N) at the same frequency as the horizontal synchronizing pulses, the signals $S_{DH}$ and $S_{CH}$ are phase-compared in phase comparator 44. As is well known in the art, the oscillation frequency of voltage controlled oscillator 41 is controlled by the output of phase comparator 44.

As described above, in the normal operation condition both the load signal $S_L$ and hold signal $S_F$ are in the "1" state, so that the counter 43 is not loaded to a different initial value and the output at the carry output terminal CA of counter 43 is not held. Therefore, the AFC circuit or loop, which consists of voltage controlled oscillator 41, divider 42, counter 43 and phase comparator 44, operates by itself in the conventional manner.

THE OPERATION IN THE DELAYED CONDITION

Next, the operation in the delayed condition will be explained in reference to FIG. 7. The delayed condition means that the negative-going edge of the reproduced horizontal synchronizing signal $S_H$ is delayed with respect to the pulse $S_W$, for example, due to the occurrance of drop-out.

Figure 7A:
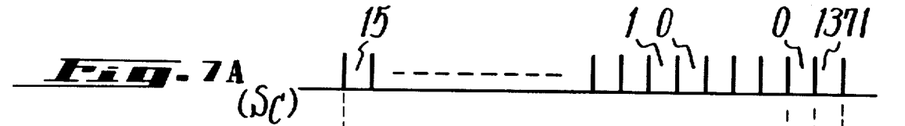
Figure 7B:
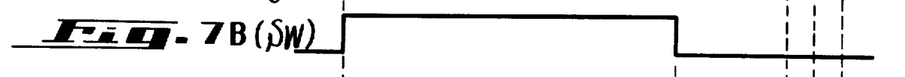
Figure 7C:
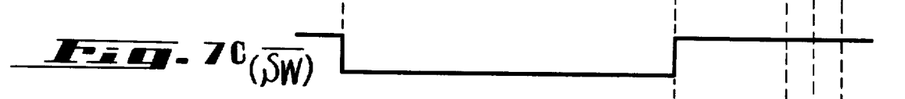
Figures 7D, 7E, 7F:
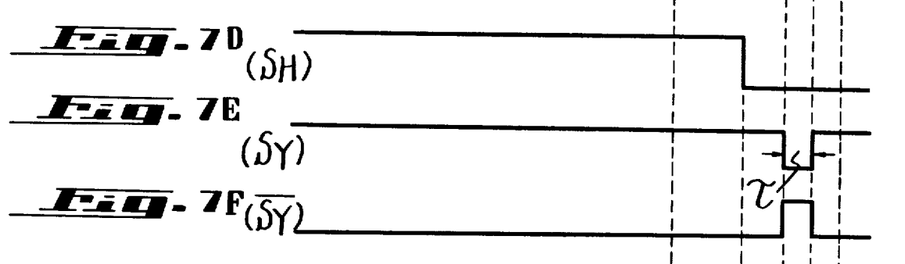
Figure 7G:
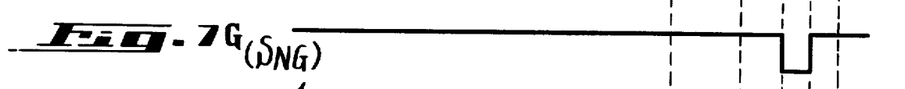
Figure 7H:
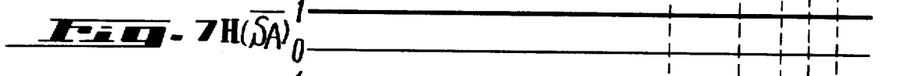
Figures 7I, 7J:
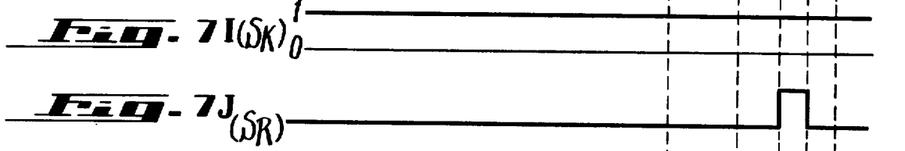
Figures 7K, 7L, 7M, 7O, 7P:
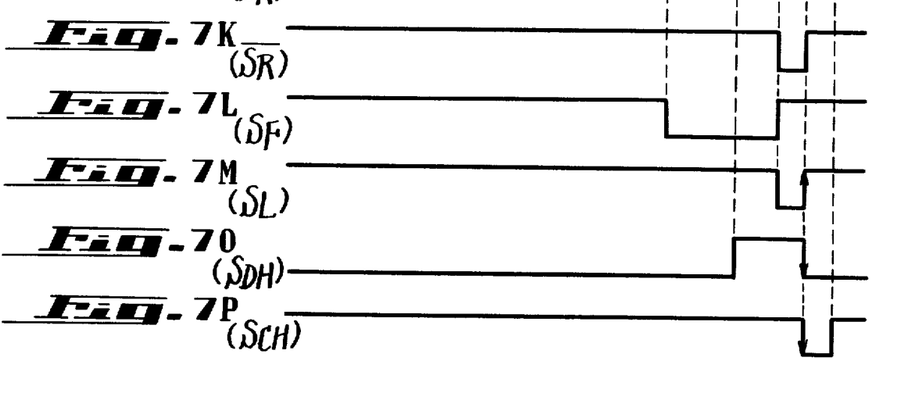

As shown in FIGS. 7B and 7E, when the signal $S_Y$ is obtained from signal generator 60 delayed somewhat after termination of the window pulse $S_W$ from pulse generator 50, NAND-circuit 72 of detecting circuit 70 provides the pulse $S_{NG}$ shown in FIG. 7G. However, the output $\overline{S}_A$ of counter circuit 80 remains in the "1" state until the pulse $S_{NG}$ is counted in counter circuit 80 up to a count of 255, as shown in FIG. 7H. Because no pulse $S_{OK}$ is provided from detecting circuit 70, the output $S_K$ of monostable multivibrator 92 of hold signal generator 90 is in the "1" state, as shown in FIG. 7I. Accordingly, the output $S_R$ of NAND-circuit 93 becomes "1" only during the period $\tau$ where the output $S_Y$ of signal generator 60 is "0" as shown in FIG. 7J. As a result, the output $\overline{S}_R$ of inverter 94 becomes "0" during the period that signal $S_Y$ is "0", as shown in FIG. 7K. Thus, flip-flop 91 provides the hold signal $S_F$ which becomes "0" from the negative-going edge of window pulse $S_W$ to the negative-going edge of output $\overline{S}_R$, as shown in FIG. 7L, so that the counter 43 is held in the state of "0"

During the operation in the delayed condition, the output $S_L$ of load signal generator 75 becomes "0" when the signal $\overline{S}_Y$ is "1", as shown in FIG. 7M, and the "0" hold state of counter 43 is released at the positive-going edge of output $S_L$. At this time, the counter 43 produces the output $S_{CH}$ (FIG. 7P) at its carry terminal CA and its initial state is loaded to a count of "1371". At the same time, the output $S_{DH}$ (FIG. 7O) of delay circuit 46 is forced to "0" at the positive-going edge of output $S_L$. As a result, the signal $S_{CH}$ of counter 43 coincides with the signal $S_{DH}$ of delay circuit 46 in phase and hence the phase comparator 44 produces no error output. Thus, the AFC circuit substantially stops its phase comparison operation. Then, it is noted that the initial state of counter 43 is loaded to a count of "1371" which is greater than "1364" by 7 counts. With the counter 43 being thus loaded to the count of "1371", a next window pulse $S_W$ appears at the position delayed by 7 counts.

The reason the initial count of the counter 43 is shifted to "1371" is as follows: there are normally 1364 counts of the clock signal $S_C$ between successive horizontal synchronizing signals, so that if the counter 43 starts to count from the initial count "1363", the window pulse $S_W$ again occurs just in advance of the occurrance of the signal $S_Y$. Therefore, increasing the initial count of the counter 43 by 7 counts substantially puts the signal $S_Y$ within the window pulse $S_W$.

Thus, the pulse $S_{OK}$ from the detecting circuit 70 will be again obtained at the subsequent occurrence of the window pulse $S_W$, so that the automatic frequency control operation of this circuit will be performed in the same manner as the normal operation.

Since the phase comparison operation is stopped until a succession of pulses $S_{NG}$ is counted continuously up to a count of 255 from detecting circuit 70 when the signal $S_Y$ does not occur during the window pulse $S_W$, the oscillation frequency of voltage controlled oscillator 41 is not disturbed. That is, although the reproduced horizontal synchronizing signal is disturbed, the frequency of the output signal obtained at output terminal 48 will not be disturbed thereby.

When the pulses $S_{NG}$ are counted continuously up to a count of 255 from detecting circuit 70, the output $\bar{S}_A$ of counter circuit 80 becomes "0". As a result, the output $S_L$ of load signal generator 75 and output $S_F$ of hold signal generator 90 become "1". This means that there are not provided such signals to hold counter 43 or to load the same to a count of "1371". Accordingly the signal $S_{CH}$ from counter 43 is phase-compared with the signal $S_{DH}$ from delay circuit 46 formed by delaying the horizontal synchronizing signal $S_H$ by 400 n sec at its positive-going edge, and thereby the AFC circuit is rapidly locked-in.

When the AFC circuit is locked-in and the pulse $S_{OK}$ is provided continuously up to a count of 15 from detecting circuit 70, the counter 83 is reset thereby and the output $\bar{S}_A$ of counter 80 becomes "1". The oscillation frequency of voltage controlled oscillator 41 is not disturbed until the pulse $S_{NG}$ is next provided continuously up to a count of 255 from detecting circuit 70.

THE OPERATION IN THE ADVANCE CONDITION

Finally, the operation in the advance condition will be explained in reference to FIG. 8. The advance condition means that the negative-going edge of the reproduced horizontal synchronizing signal occurs ahead of the window pulse $S_W$, for example, due to skew error.

Figure 8A:
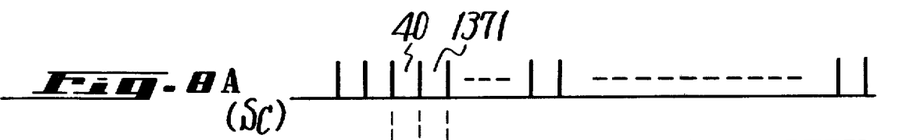
Figure 8B:
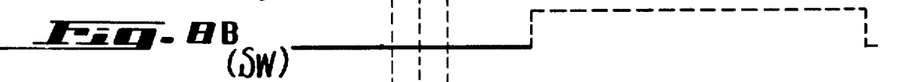
Figure 8C:
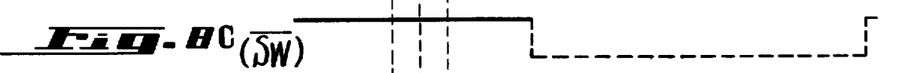
Figure 8D:
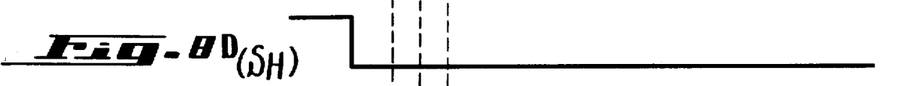
Figures 8E, 8F:
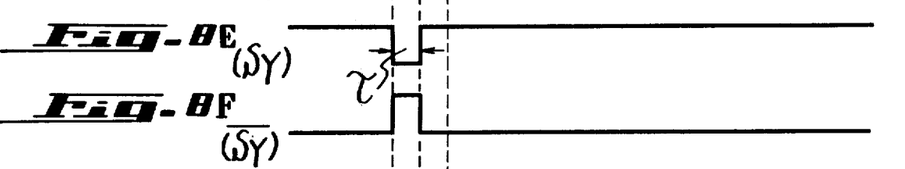
Figure 8G:
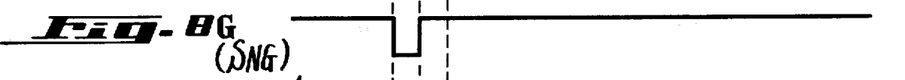
Figure 8H:
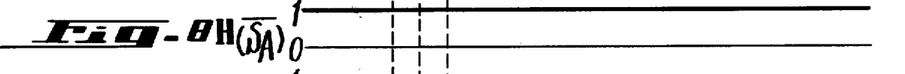
Figure 8I:
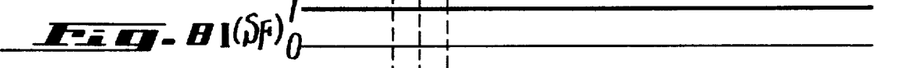
Figure 8J:
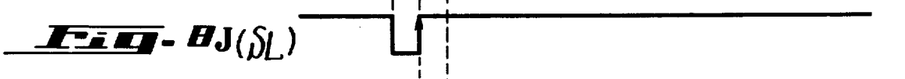
Figure 8K:
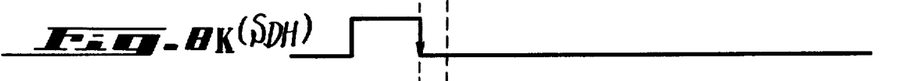
Figure 8L:
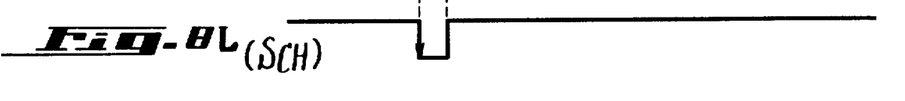

As shown in FIGS. 8B and 8E, when the signal $S_Y$ from the signal forming circuit 60 is in advance of the window pulse $S_W$, detecting circuit 70 provides pulse $S_{NG}$ as shown in FIG. 8G. In this case, the output $\bar{S}_A$ of counter circuit 80 is in the "1" state until the counter circuit 80 counts the pulse $S_{NG}$ up to a count of 255. Accordingly, as shown in FIG. 8J, the output $S_L$ of load signal generator 75 becomes "0" during the time that signal $\bar{S}_Y$ is "1". Since the state of counter 43 is forcibly loaded to "1371" at the positive-going edge of the output $S_L$, the counter 43 provides the signal $S_{CH}$ which goes to "0" at the positive-going edge of output $S_L$ as shown in FIG. 8L. At the same time, the output $S_{DH}$ of delay circuit 46 is forced to "0" at the edge of output $S_L$ as shown in FIG. 8K, so that the output signals $S_{DH}$ and $S_{CH}$ coincide with each other at their negative-going edges. As a result, as in the case of FIG. 7, the AFC circuit substantially stops its phase comparison operation.

Also, in this case, if the interval between adjacent horizontal synchronizing signals is normal, the subsequent signal $S_Y$ occurs during the center portion of the subsequent window pulse $S_W$. Further, even if the subsequent signal $S_Y$ is not within the window pulse $S_W$, the frequency of the output signal obtained at output terminal 48 is not disturbed until a count of 255 pulses $S_{NG}$ from detecting circuit 70 is continuously provided to timing circuit 80.

Figure 9:
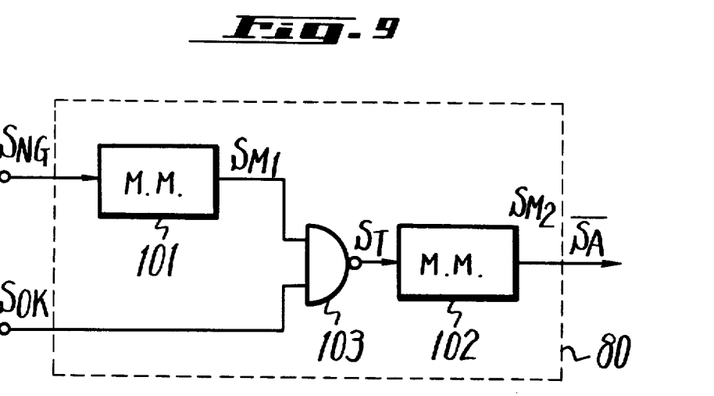
FIGS. 9 and 11 are schematic block diagrams showing modifications of the timing circuit included in the write clock pulse signal generator of FIG. 4.

FIG. 9 shows another embodiment of timing circuit 80 for counting pulses $S_{OK}$ and $S_{NG}$ from detecting circuit 70. The counter circuit 80 of this example is formed of two monostable multivibrators 101, 102 of the retrigger type and a NAND-circuit 103. In this case, the time constant of first monostable multivibrator 101 is selected as 15 horizontal periods and the time constant of second monostable multivibrator 102 is selected as 255 horizontal periods. First monostable multivibrator 101 is triggered by the pulse $S_{NG}$, shown in FIG. 10A, from detecting circuit 70, while second monostable multivibrator 102 is triggered by the output $S_T$, shown in FIG. 10D, from NAND-circuit 103 which is supplied with an output $S_{M1}$, shown in FIG. 10B, of first monostable multivibrator 101 and the pulse $S_{OK}$, shown in FIG. 10C, of detecting circuit 70.

Figure 10A:
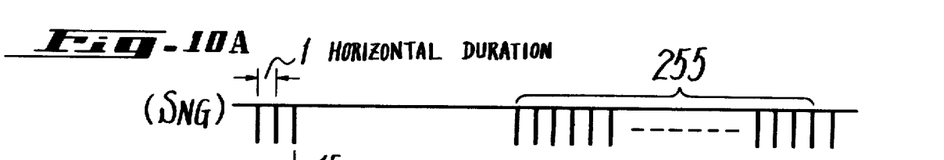
FIGS. 10 and 12 are waveform diagrams to which reference will be made in explaining the operation of the counter circuits of FIGS. 9 and 11, respectively.
Figure 10B:
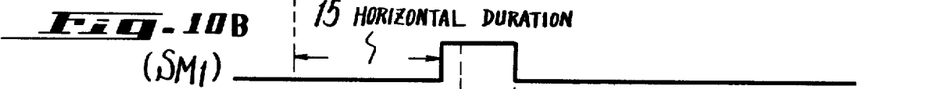
Figures 10C, 10D:
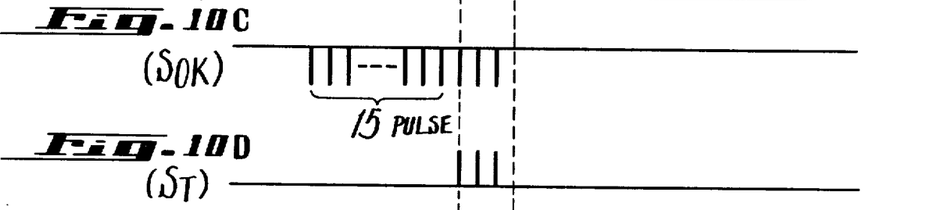
Figure 10E:
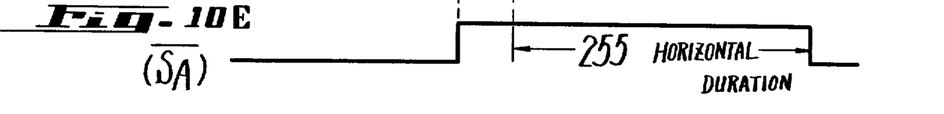

As shown in FIG. 10B, the output $S_{M1}$ of first monostable multivibrator 101 becomes "0" when it is triggered by the pulse $S_{NG}$, but becomes "1" when more than 15 pulses $S_{OK}$ are continuously provided, that is, when the pulses $S_{NG}$ are not applied to first monostable multivibrator 101 more than 15 horizontal periods. When the signal $S_{M1}$ becomes "1", the output $S_T$ of NAND-circuit 103 becomes "1" at every time when the pulse $S_{OK}$ is applied thereto. Thus, the second monostable multivibrator 102 is triggered by the signal $S_T$ and an output $S_{M2}$ thereof and hence the output $\bar{S}_A$, shown in FIG. 10E, of timing circuit 80 becomes "1".

When the pulse $S_{OK}$ is not provided from detecting circuit 70 but 255 pulses $S_{NG}$ are continuously produced therefrom, and therefore pulse $S_{OK}$ is not applied to NAND-circuit 103 in any of 255 consecutive horizontal periods, the output $\bar{S}_A$ of timing circuit 80 becomes "0". Thus, if more than 15 pulses $S_{OK}$ are obtained continuously, the output $\bar{S}_A$ is "1", which state will be kept until 255 consecutive pulses $S_{NG}$ are provided. If 255 pulses $S_{NG}$ are continuously provided, the output $\bar{S}_A$ becomes "0".

Figure 11:
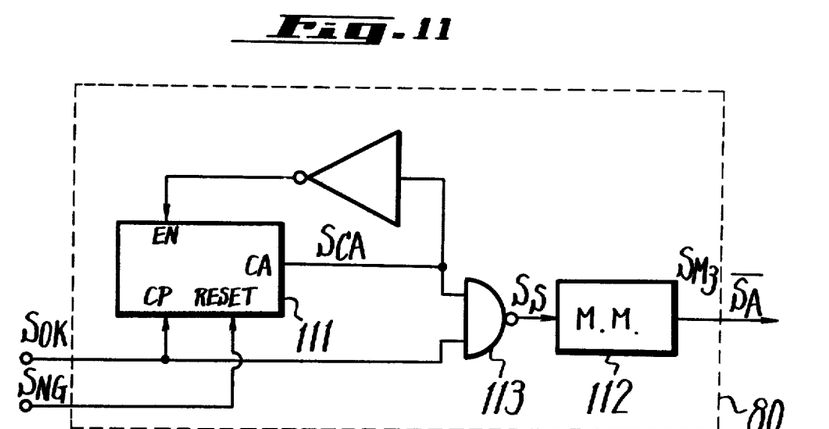

FIG. 11 shows a further embodiment of counter circuit 80 in which a 4 bit binary counter 111, a monostable multivibrator 112 and a NAND-circuit 113 are used. In this case, the time constant of monostable multivibrator 112 is selected as 255 horizontal periods.

Figures 12A, 12B:
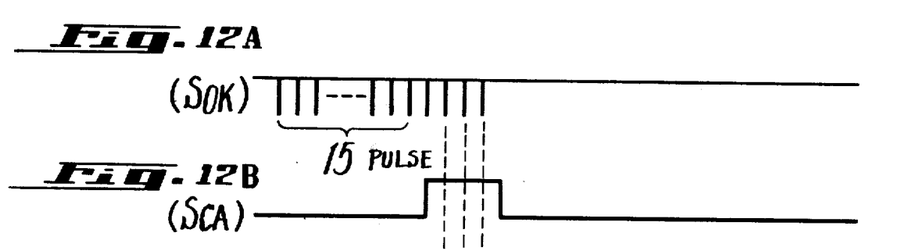
Figure 12C:
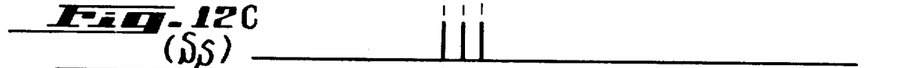
Figure 12D:
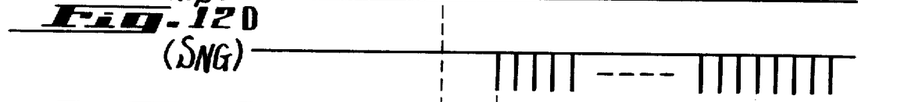
Figure 12E:
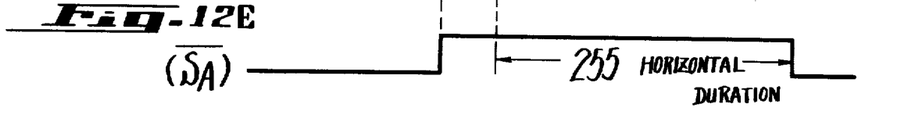

With the example of FIG. 11, pulse $S_{OK}$, shown in FIG. 12A, is applied from detecting circuit 70 to binary counter 111. When 15 consecutive pulses $S_{OK}$ are counted, an output $S_{CA}$, shown in FIG. 12B, of counter 111 becomes "1". When at least one pulse $S_{NG}$, shown in FIG. 12D, is supplied to counter 111 from detecting circuit 70, the output $S_{CA}$ of counter 111 becomes "0". Whenever output $S_{CA}$ is "1", if the pulse $S_{OK}$ is provided from detecting circuit 70, an output $S_S$, shown in FIG. 12C, of NAND-circuit 113 becomes "1" whenever when the pulse $S_{OK}$ becomes "0". Monostable multivibrator 112 is triggered by the signal $S_S$ and its output $S_{M3}$ and accordingly output $\bar{S}_A$, shown in FIG. 12E, of timing circuit 80 becomes "1". Thus, when 255 consecutive pulses $S_{NG}$ are provided from detecting circuit 70 and accordingly the pulse $S_{OK}$ is not supplied for 255 consecutive horizontal periods, the output $\bar{S}_A$ becomes "0". Accordingly, the timing circuit 80 shown in FIG. 11 operates in the same manner as the timing circuits 80 shown in FIGS. 4 and 9.

It will be apparent that many modifications and variations could be effected by one skilled in the art without departing from the spirits or scope of the novel concepts of the invention, so that the scope of the invention should be determined by the appended claims.

I claim as my invention:
1. A clock pulse generator comprising:
   input means for receiving an external reference signal;

controlled oscillator means for generating a clock signal whose frequency is varied by a control signal applied to said oscillator means;

counter means for frequency-dividing said clock signal to obtain a comparing signal having substantially the same frequency as said external reference signal;

phase comparator means for comparing the phase of said comparing signal with the phase of said external reference signal and providing said control signal in correspondence to a detected phase difference therebetween;

first signal forming means for forming a window pulse between a first count and a second count of said counter means;

second signal forming means for generating a further pulse having a pulse width narrower than the width of said window pulse and in a predetermined time relation with said external reference signal;

detecting circuit means for providing a first detecting signal whenever said further pulse occurs substantially during said window pulse, and a second detecting signal whenever said further pulse occurs substantially at a time other than during said window pulse; and means responsive to said first and second detecting signals for selectively inhibiting said control signal when said further pulse does not occur substantially during said window pulse, including means for generating a hold signal in response to a succession of a predetermined number of said first detecting signals; and, means for causing said counter means to hold the count stored therein in response to said hold signal.

2. A clock pulse generator according to claim 1; in which said means for generating the hold signal includes a first counter for counter a predetermined number of second detecting signals, a second counter for counting said predetermined number of said first detecting signals, and means for holding said second counter at said predetermined count of said first detecting signals and resetting said first counter for producing said hold signal whenever said second counter counts said predetermined number of said first detecting signals, said first counter removing said hold signal whenever said first counter counts said predetermined number of second detecting signals.

3. A clock pulse generator according to claim 1; in which said means for generating the hold signal includes a first monostable multivibrator providing a signal of a first predetermined duration in response to said second detecting signals, a logic NAND gate having inputs and an output, one of said inputs receiving said signal of a first predetermined duration, the other of said inputs receiving said first detecting signals, and a second monstable multivibrator connected to the output of said logic NAND gate and providing a signal of a second predetermined duration as said hold signal.

4. A clock pulse generator according to claim 1; in which said means for generating the hold signal includes a succession counter having a counting terminal receiving each said first detecting signal, a reset terminal for resetting said succession counter in response to said second detecting signals and an output terminal, means for holding said succession counter at a predetermined count whenever said succession counter attains said predetermined count, a logic NAND gate having inputs and an output, one of said inputs being connected with said output terminals of said succession counter and another of said inputs being connected to receive said first detecting signals, and a monostable multivibrator connected to the output of said logic NAND gate and providing a signal of predetermined duration as said hold signal.

* * * * *